G. L. FECKER.
RANGE FINDER.
APPLICATION FILED MAR. 19, 1917.
1,355,954.
Patented Oct. 19, 1920.
3 SHEETS—SHEET 1.
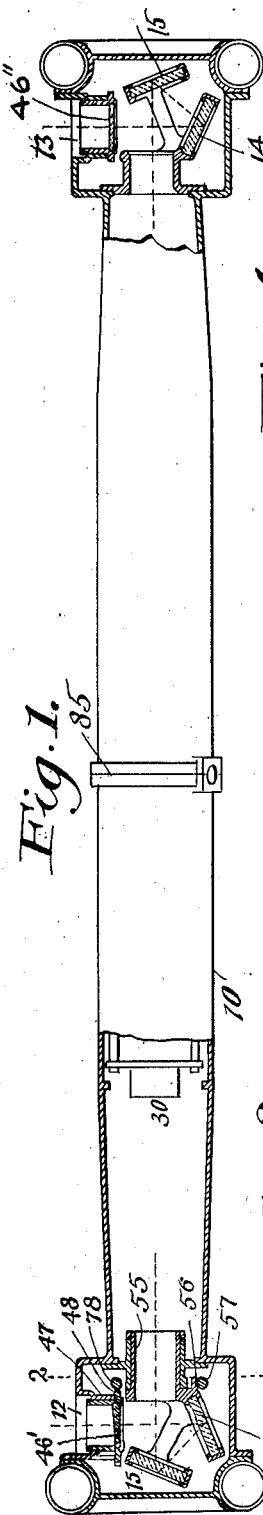
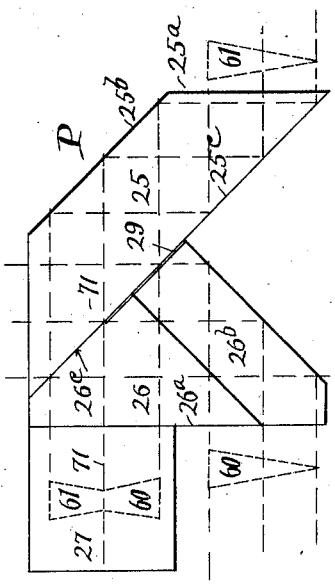
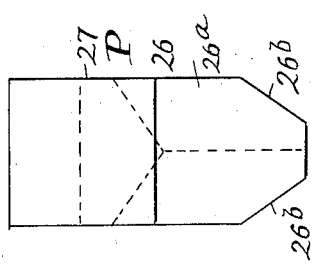
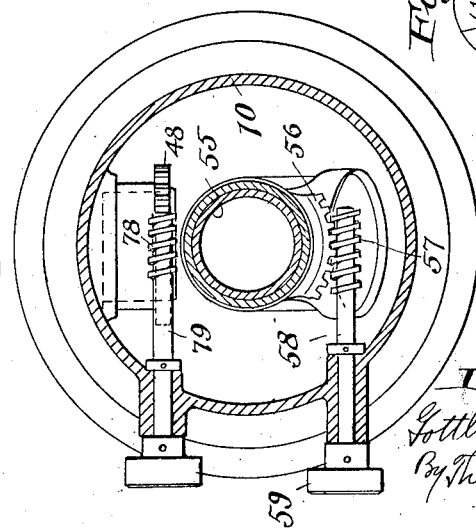
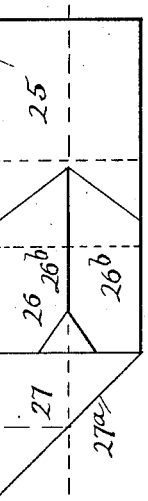
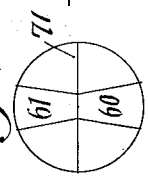
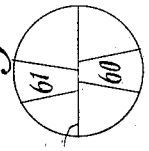
Inventor
Gottlieb L. Fecker
By Thurston & Kwis
attys

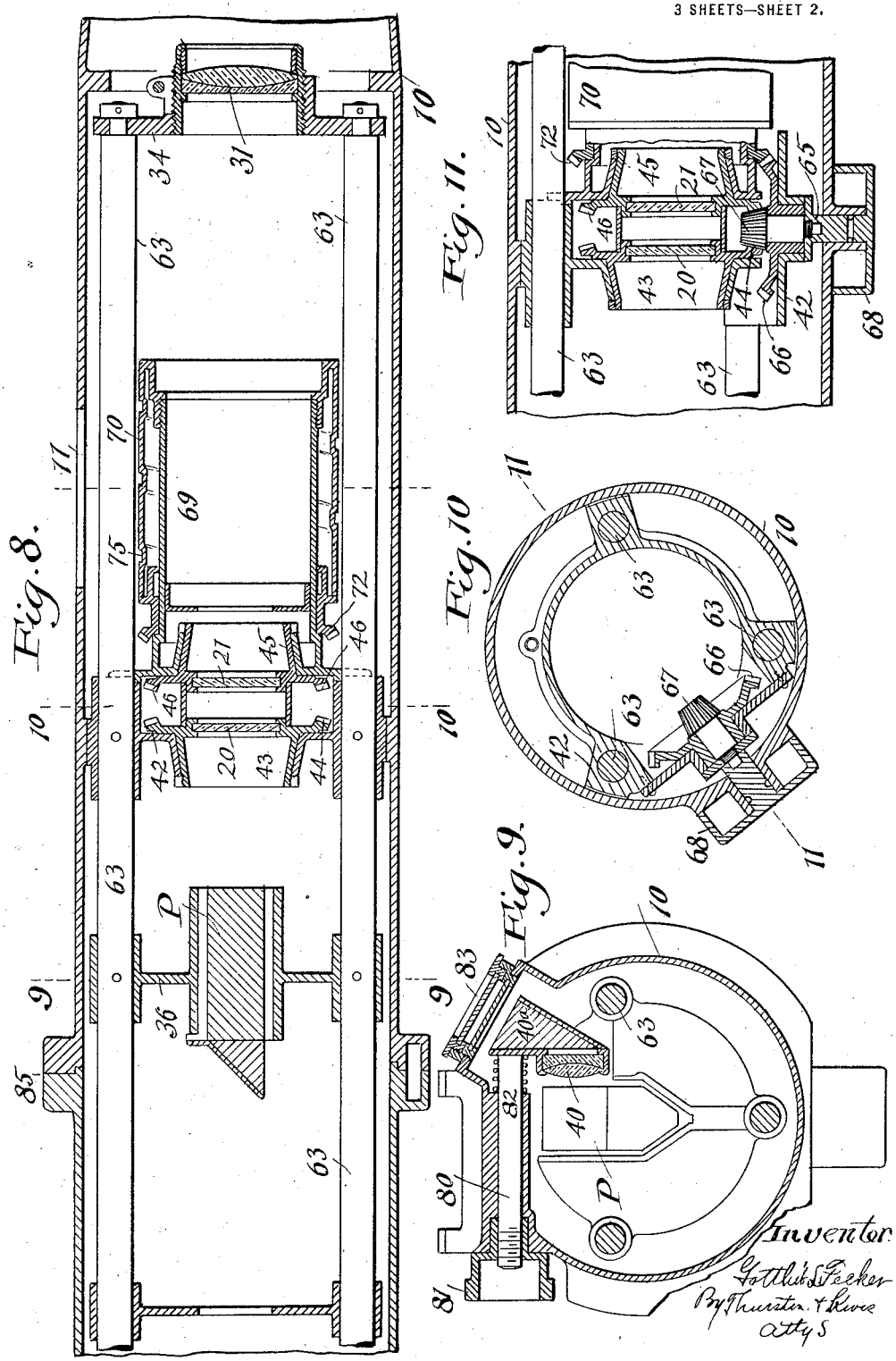

G. L. FECKER.
RANGE FINDER.
APPLICATION FILED MAR. 19, 1917.
1,355,954.
Patented Oct. 19, 1920.
3 SHEETS—SHEET 3.
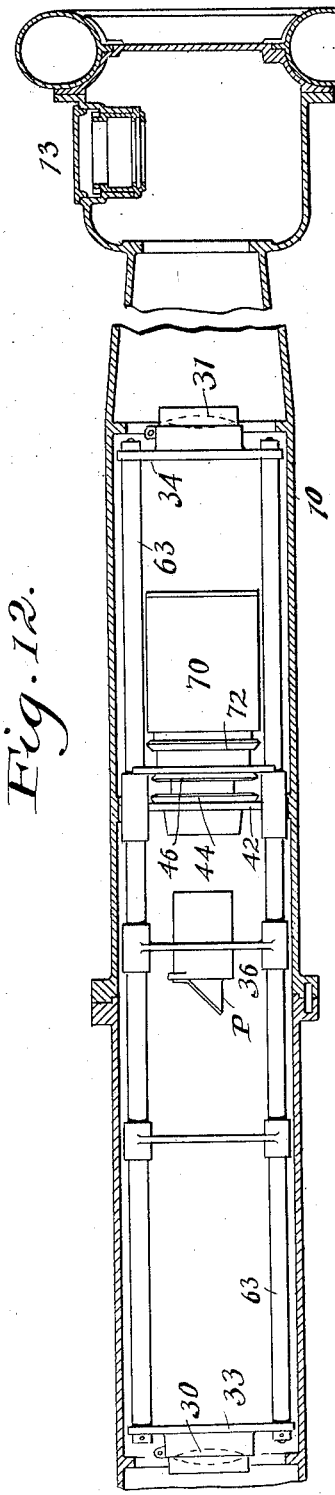
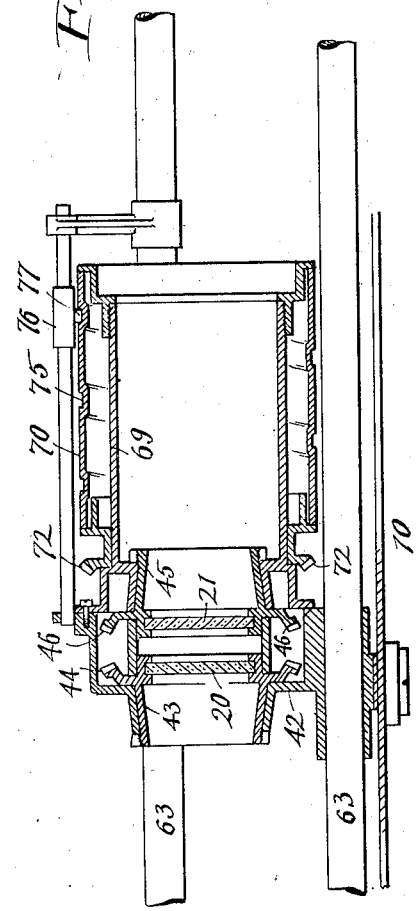
Inventor:
Gottlieb L. Fecker
By Thurston & Kwis
attys

UNITED STATES PATENT OFFICE.

GOTTLIEB L. FECKER, OF CLEVELAND, OHIO, ASSIGNOR TO THE WARNER & SWASEY COMPANY, OF CLEVELAND, OHIO, A CORPORATION OF OHIO.

RANGE-FINDER.

1,355,954.    Specification of Letters Patent.    Patented Oct. 19, 1920.

Application filed March 19, 1917. Serial No. 155,697.

*To all whom it may concern:*

Be it known that I, GOTTLIEB L. FECKER, a citizen of the United States, residing at Cleveland, in the county of Cuyahoga and State of Ohio, have invented a certain new and useful Improvement in Range-Finders, of which the following is a full, clear, and exact description.

This invention relates to one man range finders or distance measurers. The objects are to produce a practical, durable and easily portable instrument of this sort, which is so constructed and organized, both with respect to its optical and mechanical features, that an operator may quickly and with a minimum chance of error, adjust the instrument so that it will accurately indicate the distance of any object within the limits of its capacity.

The invention consists in the construction and combination of parts shown in the accompanying drawings and hereinafter described and definitely pointed out in the appended claims.

In the drawings, Figure 1 is a front elevation of an instrument which embodies the invention, the two ends of the instrument being shown in vertical longitudinal section; Fig. 2 is a transverse sectional view in the plane of line 2—2 on Fig. 1; Fig. 3 is an end view of the compound prism which forms an essential part of the invention; Fig. 4 is a side elevation of said compound prism together with representations of the images as they are delivered to both ends of the prism and as delivered from the prism. Fig. 5 is a bottom view of the prism; Fig. 6 is a view of the field of vision at the ocular before the images have been brought into alinement; Fig. 7 is a similar view when the images have been brought into alinement; Fig. 8 is a longitudinal central sectional view of the middle part of the instrument; Fig. 9 is a transverse sectional view in the plane of line 9—9 on Fig. 8; Fig. 10 is a transverse section in the plane of line 10—10 on Fig. 8; Fig. 11 is a longitudinal section of a part of the instrument in the plane of line 11—11 on Fig. 10. Fig. 12 is a plan view of the middle part and one end of the instrument with the tubular frame shown in central horizontal section; Fig. 13 is a horizontal longitudinal sectional view of the wedge prisms and indicator drum and the mountings thereof.

The base frame of the instrument is a stiff tube 10 having adjacent its ends the apertures 12 and 13 for the admission of light rays from the target or object whose distance is to be measured. Behind each of these apertures is a double reflecting device which reflects the entering rays and sends them, at right angles, into the tube 10 and toward one another. While there are several specific kinds of reflectors which will reflect the light rays as stated, I prefer to employ the known penta-mirrors shown,—each composed of two mirrors 14 and 15, fixedly held in the proper relation to one another, and arranged as shown within the tube 10 behind said apertures.

The base line of the instrument is of known length, and is the distance between the points at which the central light rays that enter the two apertures respectively impinge against the associated mirrors 14.

Within the tube 10 are two optical trains which respectively begin at the two apertures and terminate in a common ocular 40. The left optical train includes the left penta-mirrors 14, 15, the left objective 30, which is fixed within the tube, a compound reflecting prism, indicated generally by the reference character P, and the ocular 40. The right optical train includes the right penta-mirrors 14, 15, the right objective prism 31, the two oppositely rotatable wedge prisms 20, 21, the said compound reflecting prism P, and the ocular 40.

It is obvious that the light rays from the same point on the target, which enter opposite ends of the instrument, will be at an angle to each other. The instrument is to be pointed so that the light rays which enter the left aperture 12 will, after they are reflected by the adjacent reflectors, proceed in directions which are parallel with said imaginary base line. The light rays which enter the right aperture after they are reflected by the adjacent reflectors will not be parallel to said imaginary base line; but by the turning of the wedge prisms 20, 21, equally in opposite directions, said light rays will be bent to an extent such that they will become parallel to said base line, and will become alined with corresponding light rays which come from the left end of the instrument. By ascertaining what angular deflection of the light rays the rotation of the wedge prisms was required to effect to bring about said alinement, the necessary data will have been provided for calculating the distance of the target from the instrument. That is to say, one will know the length of the base of a right angle triangle, and will know the two acute angles of such triangle, and will, therefore, be able to ascertain the perpendicular of the triangle, which is the distance between the instrument and the target.

The compound reflecting prism P to which reference is made consists essentially of three prisms cemented together, viz: the double reflecting prism 25; and the inverting roof prism 26, and the right angle reflecting prism 27. The prism 25 is set so that its end face 25$^a$ is at right angles to the optical axis of the instrument, and it has two parallel reflecting surfaces 25$^b$, 25$^c$, which lie at the angle of 45° thereto. The inverting roof prism 26 is substantially a right angle triangle whose long side 26$^a$ faces the light rays coming from the left end of the instrument, and is at right angles to the optical axis of the instrument. The reflecting roof surfaces 26$^b$ of this prism form the lower side thereof which is at an angle of 45° to said end surface. The third side 26$^c$ which is at 90° to the side last mentioned, and therefore at 45° to the optical axis of the instrument, is coincident with and is cemented to the lower inclined reflecting surface 25$^c$ of the prism 25. A portion of the contacting surfaces of one of the prisms is silvered, preferably the surface of the prism 26, thereby forming the two-sided mirror 29, the upper edge of which is a horizontal line that is in the focal plane of the instrument, and therefore horizontally divides the field of vision in the ocular.

This compound prism is secured in such position that the beams from the right end of the instrument enter prism 25 through the vertical right face thereof, while beams from the left end of the instrument enter prism 26 through the vertical left face thereof.

It will be understood that the images from both ends of the instrument are inverted by the objectives 30, 31, through which they pass, and therefore reach the compound prism in this inverted condition, as indicated by 60, 61, in Fig. 4.

The rays from the right enter the prism 25 and are reflected from the surface 25$^c$ to the surface 25$^b$, and from thence are reflected toward the prisms 26 and 27. But the rays which represent the lower half of the entering image, i. e., the upper half of the target, will be reflected from the surface 25$^b$ against the silver mirror 29, which will reflect these rays upward and cause them to be lost to the instrument. But the rays which outline the lower half of the target will pass over said mirror 29, through prisms 26 and 27 to the inclined reflecting surface 27$^a$ of the prism 27, which surface will reflect said rays into the ocular where they will appear in the upper half of the field of vision above a horizontal dividing line 71 that represents the upper edge of the silver mirror 29,—as shown in Figs. 4, 6, 7.

The inverted image from the left objective will enter prism 26 and will thereby be reinverted. The rays from the upper half of the target will be reflected upward, but to the left of the silver mirror 29, and hence will be lost to the instrument; but the rays from the lower half of the target will be reflected against said silver mirror, and by it will be reflected into the prism 27 which prism will reflect the image of the lower half of the target into the ocular, in which said image will appear right side up, but in the lower half of the field of vision and below the horizontal line which divides said field of vision above specified, all of which appears in Figs. 4, 6 and 7.

When the instrument is first directed toward a distant target these two half images, above and below the horizontal line 71 which divides the field of vision, will be out of alinement, as shown in Fig. 6; but they will be brought into alinement, that is, the upper image will be brought into alinement with the lower image, by the turning of the wedge prisms 20 and 21. The arcual distance which these wedges must be turned from their zero position to produce the alinement of the images indicates primarily the angle between the rays coming from the target to the two apertures in the case. By calculation, however, these angles may be translated to indicate the length of the perpendicular of the right angle triangle of which the instrument forms the base; and these translated equivalents will appear on the graduated drum before mentioned. The operator will turn these wedge prisms by means which will be presently described, until, as he views the field of vision, he sees the lines which outline the two half images come into exact alinement.

Within the tube 10 is a rotatable tubular indicating drum 70 which is so connected with the mechanism for rotating these wedge prisms 20, 21, that it will be proportionately turned. This drum is to be graduated; and the graduations are observable through a sight opening 11 in the wall of tube 10. These graduations might be in terms of degress, minutes, and seconds representing the angular deflection of the light rays brought about by the rotation of the wedge prisms and required to produce the stated alinement of the light rays. Preferably, however, the graduations on the drum will be translated equivalents of manifold angular deflections; or in other words, they are preferably in terms of linear distance representing the lengths of various perpendiculars of triangles having various acute angles. Or, more specifically, they will represent distances from the instrument of various targets which require various angular deflections of the light rays which enter the right end of the instrument to bring about the alinement of those light rays which enter the left end of the instrument from the same target.

The wedge prisms 20 and 21, the range drum 70, the objectives 30 and 31, and the compound reflecting prism P are all mounted in proper relation to one another on a certain frame which is organized outside of the tube 10, but is subsequently inserted into said tube and secured therein in proper position. It might be here stated that the tube 10 as shown is constructed of two transversely separable halves, the dividing line between which is indicated by 85 in Fig. 1.

This frame includes three parallel rods 63, which are preferably made of material which is expanded and contracted very little by heat and cold. These rods pass through and are secured to several transverse frame members,—the transverse end members 33, 34, respectively, carrying two objectives 30, 31. The transverse member 36 carries the compound reflecting prism P. The transverse frame member 42 supports the wedge prisms 20, 21, and the sleeves in which they are mounted, and also supports the range drum 70.

The two wedge prisms 20, 21, are respectively secured in the tubular carriers 43, 45. These wedges are preferably disposed behind the objective 31, but they would perform their optical functions equally well if they were placed in advance of the objective. These wedges are rotatably mounted on the frame member 42 in axial alinement with one another. A bevel gear 44 is fixed to the wedge carrier 43, and another bevel gear 46 is fixed to the wedge carrier 45.

The range drum is tubular, and it is rotatably mounted on a sleeve 69 fastened coaxially to the same frame member 42; and a bevel gear 72 is fixed to this range drum. A split shaft 65 is rotatably mounted partly in the frame 42 and partly in the wall of the tube 10. Within the tube this shaft carries two bevel gears 66, 67, of which the latter meshes with both of the bevel gears 44, 46, on the wedge prism carriers, while the other meshes with the bevel gear 72 on the range drum. A knob 68 fixed to the projecting outer end of this shaft affords means by which the operator may turn the shaft, with the result of turning the two wedge prisms in opposite directions to thereby bring about the alinement of the two images in the field of vision. Likewise, the range drum is proportionately turned at the same time.

The graduations on the range drum are arranged spirally, and adjacent to a spiral groove 75 formed in the surface of said drum. A pointer slide 76 is mounted adjacent the sight opening 11 in the tube 10 over the range drum so that it may move lengthwise of said tube. This pointer slide carries a pin 77 which projects into the spiral groove in the range member, wherefore, as the range drum is turned this pointer slide will be moved lengthwise causing the pointer to follow the spiral arrangement of the graduations.

The penta-mirrors 14, 15, at the left end of the instrument are preferably carried by a frame 55 Fig. 1 having a tubular portion which is rotatably mounted in a bearing fixed within the tube 10, the axis of said bearing being coincident with the optical axis of the instrument. On this frame is a worm wheel sector 56 that is engaged by a worm 57 fixed to a small shaft 58 which projects through and is rotatably mounted in the tube 10, and carries an operating knob 59 on its outer end. By turning this screw the operator will rotate the frame which carries the penta-mirrors, with the result of raising or lowering in the field of vision that half image which comes from the left end of the instrument.

It is also desirable to provide a collimating wedge prism at one end of the instrument. Such a wedge prism 46′ is mounted in a tube 47 which is rotatably mounted in the aperture 12. This tube is provided with a worm sector 48 within tube 10 with which a worm 78 engages, said worm being on a shaft 79 which is rotatably mounted in and projects through the wall of the tube 10. The operator by turning this shaft may rotate the wedge 46′ and therefore correct any ordinary defect in the collimation of the light rays which enter the left end of the instrument. The wedge prism 46′ in aperture 12 as also the plain glass disk 46″ in aperture 13 affords a tight closure to keep out the dust and moisture.

The ocular 40 is of familiar form. But it and a prism 40ª are carried on the end of a slide 80 within the tube 10. This slide has a threaded outwardly projecting end on which a nut 81 is screwed, which nut together with a spring 82, are the means for effecting such an endwise movement of the slide 80 as may be required. The prism 40ª is of familiar form and its function is to reflect the image toward the angularly disposed sight opening or eye piece 83.

Having described my invention, I claim:—

1. In an optical range finder the combination with two objectives defining a base line, reflectors for deflecting the incoming rays in the direction of the base line, a separating and image-uniting prism system and a measuring wedge mechanism, of means for compensating for inaccuracies of the optical trains of the instrument, said means comprising a tubular frame disposed coaxially with the base line for carrying the reflector associated with one of the objectives and means for revolving the said tubular frame about its axis.

2. In an optical range finder the combination with two objectives defining a base line, reflectors for deflecting the incoming rays in the direction of the base line, a separating and image-uniting prism system and a measuring wedge mechanism, of means for compensating for inaccuracies of the optical trains of the instrument, said means comprising a tubular frame disposed coaxially with the base line for carrying the reflector associated with one of the objectives, means for revolving said frame, a wedge prism in front of the revolubly mounted reflector and means for revolving the said prism about the optical axis.

3. An optical range finder of the base line type comprising an outer tube, a frame within the tube having a low coefficient of expansion and carrying as a single rigid mechanical unit two optical trains including two objectives, an image uniting prism, a measuring wedge mechanism and an ocular, reflectors carried by the tube at opposite ends thereof for directing the incoming rays to said optical trains and means for shifting the rays passing to one of the objectives in lateral and vertical directions.

4. An optical range finder of the base line type comprising an outer tube, a frame within the tube having a low coefficient of expansion and carrying as a single rigid mechanical unit two optical trains including two objectives, an image uniting prism, a measuring wedge mechanism and an ocular, reflectors carried by the tube at opposite ends thereof for directing the incoming rays to said optical trains and means for modifying the direction of the rays passing to one of the said objectives, said means comprising a tubular element revolubly mounted on the tube axially thereof and carrying one of the reflectors and a prism revolubly mounted on the tube in advance of the said reflector and in a plane at right angles to the incoming rays.

In testimony whereof I hereunto affix my signature in the presence of two witnesses.

GOTTLIEB L. FECKER.

Witnesses:
J. W. FECKER,
H. W. BAILEY.